United States Patent
Sun et al.

(10) Patent No.: US 10,032,299 B2
(45) Date of Patent: Jul. 24, 2018

(54) PORTABLE IMAGE DEVICE FOR GENERATING APPLICATION IMAGES

(71) Applicant: Samsung Electronics Co., Ltd., Suwon-si, Gyeonggi-do (KR)

(72) Inventors: Yajie Sun, Mountain View, CA (US); Tom Flynn, Mountain View, CA (US); Ciaran Rochford, Mountain View, CA (US); Jon Shemitz, Santa Cruz, CA (US); Bing Xu, Livermore, CA (US); Nitin Bajaj, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 15/089,971

(22) Filed: Apr. 4, 2016

(65) Prior Publication Data
US 2017/0287182 A1    Oct. 5, 2017

(51) Int. Cl.
| G09G 5/00 | (2006.01) |
| G06T 11/60 | (2006.01) |
| G06T 3/40 | (2006.01) |

(52) U.S. Cl.
CPC ............. G06T 11/60 (2013.01); G06T 3/40 (2013.01)

(58) Field of Classification Search
CPC .................. G06T 5/002; G06T 2200/12
See application file for complete search history.

(56) References Cited

U.S. PATENT DOCUMENTS

| 6,414,681 B1* | 7/2002 | Ohshima ............... G06F 3/012 345/428 |
| 7,489,318 B1 | 2/2009 | Wilt |
| 8,780,180 B2 | 7/2014 | Parulski |
| 2011/0090324 A1 | 4/2011 | Mentz et al. |
| 2012/0287243 A1* | 11/2012 | Parulski ............ H04N 13/0221 348/46 |
| 2013/0063452 A1 | 3/2013 | Ali et al. |
| 2013/0258055 A1 | 10/2013 | Chen |
| 2014/0200861 A1* | 7/2014 | DeVito ............... G06F 17/5004 703/1 |
| 2015/0072791 A1 | 3/2015 | Batista Jerez |
| 2015/0081764 A1 | 3/2015 | Zhao et al. |
| 2015/0082239 A1 | 3/2015 | Zhao et al. |
| 2015/0087288 A1 | 3/2015 | Dharawat et al. |

FOREIGN PATENT DOCUMENTS

KR    10-2008-0109442 A    12/2008

* cited by examiner

*Primary Examiner* — Thomas Lett
(74) *Attorney, Agent, or Firm* — Jefferson IP Law, LLP (57) ABSTRACT

An apparatus and a method for displaying an image on a portable image device are provided. The method includes receiving a first input indicative of an input associated with an application, generating a first image object in a buffer of the portable image device, storing the first image object in a memory of the portable image device, generating a first image using the first image object stored in the memory of the portable image device, and displaying the first image on an image display device of the portable image device.

23 Claims, 7 Drawing Sheets

PORTABLE IMAGE DEVICE FOR GENERATING APPLICATION IMAGES

TECHNICAL FIELD

The present disclosure relates to an apparatus and method for displaying an image on a portable image device. More particularly, the present disclosure relates to an apparatus and method for generating a stereo image associated with an application using a portable image device.

BACKGROUND

An application is a program designed to perform a group of coordinated functions, tasks, or activities on an electronic device. For example, an application can include at least one of a word processing function, a communication function including audio, video, and data communications including telephone calls, SMS/MMS messages, email, etc., scheduling or calendar functions, alarm functions, calculator functions, etc.

Generally, images associated with an executed application are displayed on a display of the electronic device in a two-dimensional format where a single image having a single focal point is generated. Specifically, the images to be displayed are generated by processing and rendering image content data into panels where the processing and rendering of the image content data is performed or refreshed every frame.

However, when displaying an application image in a three-dimensional or stereo format, the processing and rendering techniques according to the related art create undesired visual artifacts. For example, when the stereo image is rendered every frame, the edges of the image may vary slightly due to rendering differences between each frame causing aliasing or jagged edges in continuous stereo frames. This aliasing may undesirably make the image appear to be wiggling or swimming.

Accordingly, there is a need for generating a stereo image associated with an application using a portable image device to reduce undesirable visual artifacts.

SUMMARY

Aspects of the present disclosure are to address at least the above-mentioned problems and/or disadvantages and to provide at least the advantages described below. Accordingly, an aspect of the present disclosure is to provide an apparatus and method for generating a stereo image associated with an application using a portable image device to reduce undesirable visual artifacts.

In accordance with an aspect of the present disclosure, a method for displaying an image on a portable image device is provided. The method includes receiving a first input indicative of an input associated with an application, generating a first image object in a buffer of the portable image device, storing the first image object in a memory of the portable image device, generating a first image using the first image object stored in the memory of the portable image device, and displaying the first image on an image display device of the portable image device.

In accordance with another aspect of the present disclosure, a portable image device is provided. The portable image device includes an image display device configured to display an image, an input device configured to receive an input, and a controller configured to: receive a first input from the input device, the first input being indicative of an input associated with an application, control a buffer to generate a first image object, store the first image object in a memory, control a stereo image composer device to generate a first image using the first image object stored in the memory, and control the image display device to display the first image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., SAMSUNG HOMESYNC, APPLE TV, or GOOGLE TV), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for simulating interaction with an electronic device using a portable image device.

Figure 1:
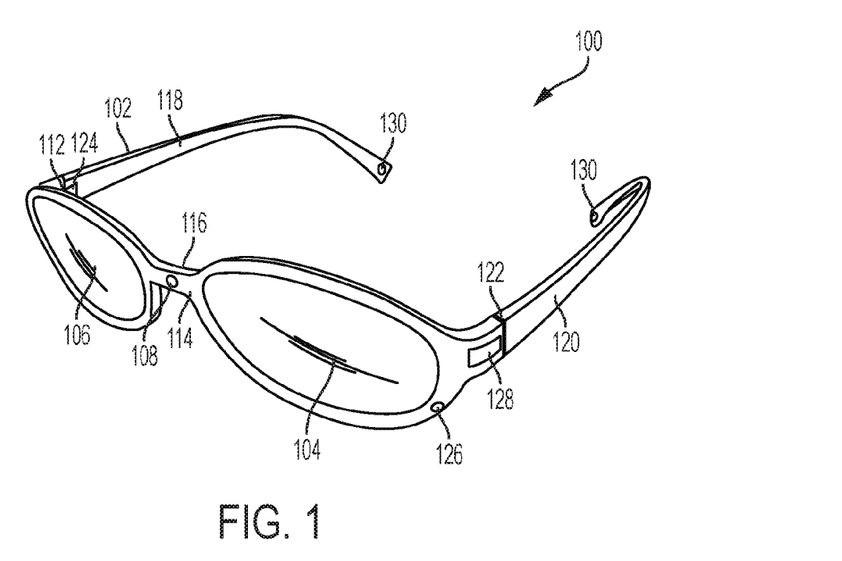
FIG. 1 illustrates a front perspective view of a portable image device according to various embodiments of the present disclosure.
Figure 2:
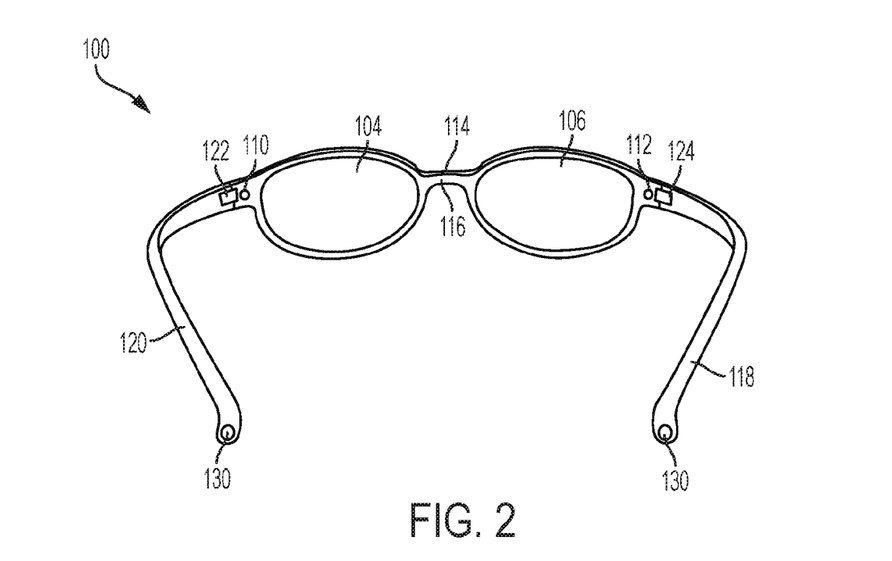
FIG. 2 illustrates a rear perspective view of the portable image device according to various embodiments of the present disclosure.

FIG. 1 illustrates a front perspective view of a portable image device according to various embodiments of the present disclosure. FIG. 2 illustrates a rear perspective view of the portable image device according to various embodiments of the present disclosure.

Referring to FIG. 1, a portable image device 100 is configured to display an image to be viewed by a single user. The portable image device 100 may be any type of portable image device such as a heads-up display or a head-mounted display (HIVID). For instance, the portable image device 100 may include glasses, goggles, or a helmet worn on the head of a user. In an exemplary embodiment, as illustrated in FIG. 1, the portable image device 100 may be a heads-up display that displays an image on, in, or through a transparent display where the image is superimposed over a current viewpoint which allows for simultaneous viewing of the image and the current surroundings.

Referring to FIGS. 1 and 2, the portable image device 100 may include a housing 102, a first transparent display 104, a second transparent display 106, an image capture device 108, a first projection device 110, and a second projection device 112. In an exemplary embodiment, the portable image device 100 may further include at least one of an input device and an output device. While the portable image device 100 is shown as having a configuration as illustrated in FIGS. 1 and 2, one of ordinary skill in the art would recognize that the portable image device 100 may have any configuration including size, shape, arrangement, and/or orientation.

The housing 102 may include a front frame 114, a rear frame 116, a first support 118, and a second support 120. In an exemplary embodiment, the first support 118 and the second support 120 may be pivotally mounted to the housing 102 by hinges 122 and 124, respectively. However, the first support 118 and the second support 120 may be secured to the housing 102 in any manner. The housing 102 may include various types of materials including glass, plastic, metal, and a combination thereof.

The first transparent display 104 and the second transparent display 106 are configured to display an image. For example, the first projection device 110 may project a first image onto the first transparent display 104 and the second projection device 112 may project a second image onto the second transparent display 106. In an exemplary embodiment, the first image and the second image may be displayed to create a stereographic image or a three-dimensional image. The first transparent display 104 and the second transparent display 106 may be made of any transparent material including glass, plastic, etc.

The image capture device 108 is configured to capture an image. For example, the image capture device 108 may capture an image external to the portable image device 100 such as within the surrounding environment of the portable image device 100. The image capture device 108 may capture an image that is within the line of sight of a user of the portable image device 100. Alternatively, the image capture device 108 may capture an image which a user is unable to see within a direct line of sight.

The image capture device 108 may include one or more cameras. As illustrated in FIG. 1, a single image capture device 108 is arranged in the housing 102 between the first transparent display 104 and the second transparent display 106. However, one or more image capture devices may be arranged in any position on the front frame 114. For instance, an image capture device 108 may be arranged above, below, to the left and/or to the right of the first transparent display 104 and/or the second transparent display 106. The image capture device 108 may be any type of capture device including an infrared camera, a red-green-blue (RGB) camera, a combination thereof, etc.

In addition, the portable image device 100 may further include one or more image capture devices (not illustrated) disposed on the rear frame 116 of the housing 102 where the image capture devices disposed on the rear frame 116 are orientated to capture images associated with the user such as for eye-tracking techniques, etc.

The first projection device 110 and the second projection device 112 are configured to project images onto the first transparent display 104 and the second transparent display 106, respectively. The first projection device 110 and the second projection device 112 may be disposed within the housing 102 where the light is projected through an opening formed in the housing 102 or the first projection device 110 and the second projection device 112 may be disposed on a surface of the housing 102.

In an exemplary embodiment, the portable image device 100 can further include at least one of an input device and/or an output device. For example, the input device can include one or more input devices such as a microphone 126 configured to generate an electrical signal from a sound wave where the electrical signal indicates an input from a user and at least one button 128 configured to receive a tactile input from a user. The at least one button 128 may include one or more touch sensors configured to operate as a power button, a volume button, a menu button, a home button, a back button, navigation buttons (e.g., left button, right button, up button, down button, etc.), and/or a combination thereof. The output device may include one or more output devices such as an audio output device 130 (e.g., a speaker) configured to output sound associated with the portable image device 100 and a vibration output device (not illustrated).

As illustrated in FIGS. 1 and 2, the input device and/or the output device may be integrally formed with the portable image device 100. For example, the at least one button 128 may be disposed on the housing 102 of the portable image device 100. In addition, the microphone 126 may be integrally formed with the housing 102 of the portable image device 100. Alternatively, the input device and/or the output device may be separate from the housing 102. For example, the microphone 126 may be a separate device from the portable image device 100 where the microphone 126 and the portable image device 100 are in communication to allow the portable image device 100 to communicate with the microphone 126.

In an exemplary embodiment, the portable image device 100 may further include one or more sensors (not illustrated) configured to detect a state or surrounding environment of the portable image device 100. For example, the one or more sensors may detect a state or surrounding environment condition of the portable image device 100 and transmit a signal to a controller of the portable image device 100.

The one or more sensors may include at least one of a proximity sensor for detecting the proximity of an object to the portable image device 100, a motion/orientation sensor for detecting a motion or orientation (e.g., rotation, acceleration, deceleration, and vibration) of the portable image device 100, an illumination sensor for detecting ambient illumination in the surrounding environment of the portable image device 100, or a combination thereof. The motion/orientation sensor may include at least one of an acceleration sensor, a gravity sensor, a geomagnetic sensor, a gyro sensor, a shock sensor, a global positioning system (GPS) sensor, and a compass sensor.

Figure 3:
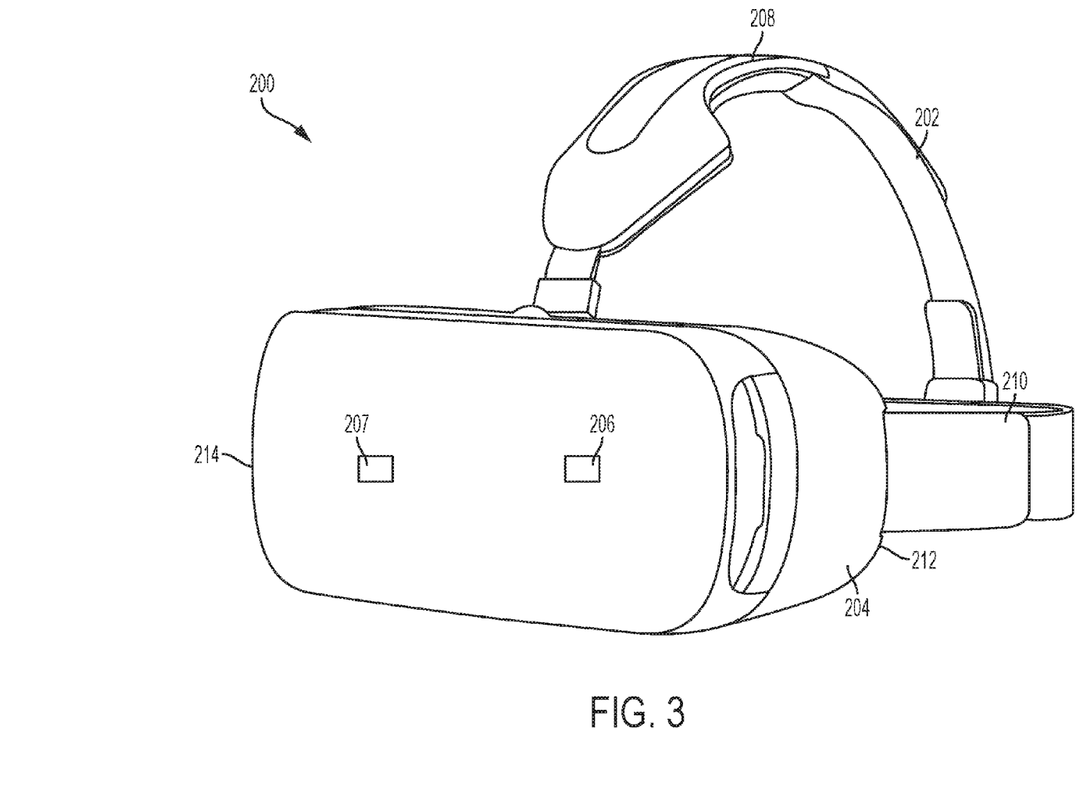
FIG. 3 illustrates a front perspective view of another portable image device according to various embodiments of the present disclosure.

FIG. 3 illustrates a front perspective view of another portable image device according to various embodiments of the present disclosure.

Referring to FIG. 3, a portable image device 200 is a head mounted display configured to display an image to a user. In an exemplary embodiment, the portable image device 200 may be used in an alternative reality (AR) environment and/or a virtual reality (VR) environment. The portable image device 200 may include a support 202, a housing 204, a first image capture device 206, and a second image capture device 207.

The support 202 is configured to secure the portable image device 200 to a user. For example, the support 202 allows the portable image device 200 to be worn and removably coupled to a user. The support 202 may include a head support 208 and/or a strap 210. While FIG. 3 illustrates both the head support 208 and the strap 210, one of ordinary skill in the art would recognize that the portable image device 200 can include one or more support elements where the support elements may have the same or different configurations.

The housing 204 may include a first surface 212 and a second surface 214. In an exemplary embodiment, the first surface 212 may be arranged on an inner portion of the housing 204 such that a portion of the first surface 212 may come in contact with the user's face. For instance, at least a portion of the first surface 212 may come in close contact with the user's face (e.g., around the eyes) where the portion of the first surface 212 may be supported on the user's face. The second surface 214 may be positioned on an external portion of the housing such that the second surface 214 is positioned away from the user's face.

The first image capture device 206 and the second image capture device 207 are configured to capture an image. For example, the first image capture device 206 and the second image capture device 207 may capture images external to the portable image device 200 such as within the surrounding environment of the portable image device 200.

The first image capture device 206 and the second image capture device 207 may be any type of image capture device. For example, the first image capture device 206 or the second image capture device 207 may be an infrared camera, an RGB camera, a combination thereof, etc. In addition, the first image capture device 206 and the second image capture device 207 may be the same type of image capture device or a different type of capture device.

As illustrated in FIG. 3, portable image device 200 includes a first image capture device 206 and a second image capture device 207. However, portable image device 200 may include one or more image capture devices. Each image capture device may be arranged in any position and/or configuration with respect to the housing 204. In addition, the first image capture device 206 and/or the second image capture device 207 may be oriented at various angles to capture images of the surrounding environment of the portable image device 200 from various points of view. For example, the first image capture device 206 and/or the second image capture device 207 may be arranged and oriented in substantially the same position as the user's eyes in order to capture images in a line of sight similar to that of the user when the portable image device 200 is not supported on the user's head. In addition, the first image capture device 206 and/or the second image capture device 207 may be alternatively or additionally arranged and oriented to capture images outside the user's line of sight.

In an exemplary embodiment, a display (not illustrated) configured to display an image may be disposed within the housing 204. The display may be a single display or a plurality of displays configured to display an image to the user. For example, the display may operate in various modes to generate two-dimensional or three-dimensional images. For example, the display may include at least one of a display panel, a lens, a laser, and a projector to create a two-dimensional or three-dimensional image including stereographic images, holograms, etc. to be viewed by the user.

The first image capture device 206 and the second image capture device 207 may be used to capture images that create stereo images to be displayed to the user on the display disposed within the housing 204. For example, referring to FIG. 3, the first image capture device 206 may have a focal point associated with a left eye of the user and the second image capture device 207 may have a focal point associated with the right eye of the user where the first image capture device 206 and the second image capture device 207 are arranged an eye width apart to capture two different images. The images captured by the first image capture device 206 and the second image capture device 207 may be processed to create a three-dimensional and/or stereo image.

In an exemplary embodiment, the portable image device 200 may further include one or more image capture devices (not illustrated) disposed within the housing 204 where the image capture devices disposed within the housing 204 are orientated to capture images associated with the user such as for eye-tracking techniques, etc.

While not illustrated in FIG. 3, portable image device 200 may further include at least one of an input device and/or an output device. For example, the input device can include one or more input devices such as a microphone configured to generate an electrical signal from a sound wave where the electrical signal indicates an input from a user and at least one button configured to receive a tactile input from a user. The at least one button may include one or more touch sensors configured to operate as a power button, a volume button, a menu button, a home button, a back button, navigation buttons (e.g., left button, right button, up button, down button, etc.), and/or a combination thereof. The output device may include one or more output devices such as an audio output device (e.g., a speaker) configured to output sound and a vibration output device.

The input device and/or the output device may be integrally formed with the portable image device 200. For example, the at least one button may be disposed on the housing 204 of the portable image device 200. In addition, the microphone may be integrally formed with the housing 204 of the portable image device 200. Alternatively, the input device and/or the output device may be separate from the housing 204. For example, the microphone may be a separate device from the portable image device 200 where the microphone and the portable image device 200 are in communication to allow the portable image device 200 to communicate with the microphone.

In an exemplary embodiment, the portable image device 200 may also further include one or more sensors (not illustrated) configured to detect a state or surrounding environment of the portable image device 200. For example, the one or more sensors may detect a state or surrounding environment condition of the portable image device 200 and transmit a signal to a controller of the portable image device 200.

The one or more sensors may include at least one of a proximity sensor for detecting the proximity of an object to the portable image device 200, a motion/orientation sensor for detecting a motion or orientation (e.g., rotation, acceleration, deceleration, and vibration) of the portable image device 200, an illumination sensor for detecting ambient illumination in the surrounding environment of the portable image device 200, or a combination thereof. The motion/orientation sensor may include at least one of an acceleration sensor, a gravity sensor, a geomagnetic sensor, a gyro sensor, a shock sensor, a global positioning system (GPS) sensor, and a compass sensor.

Figure 4:
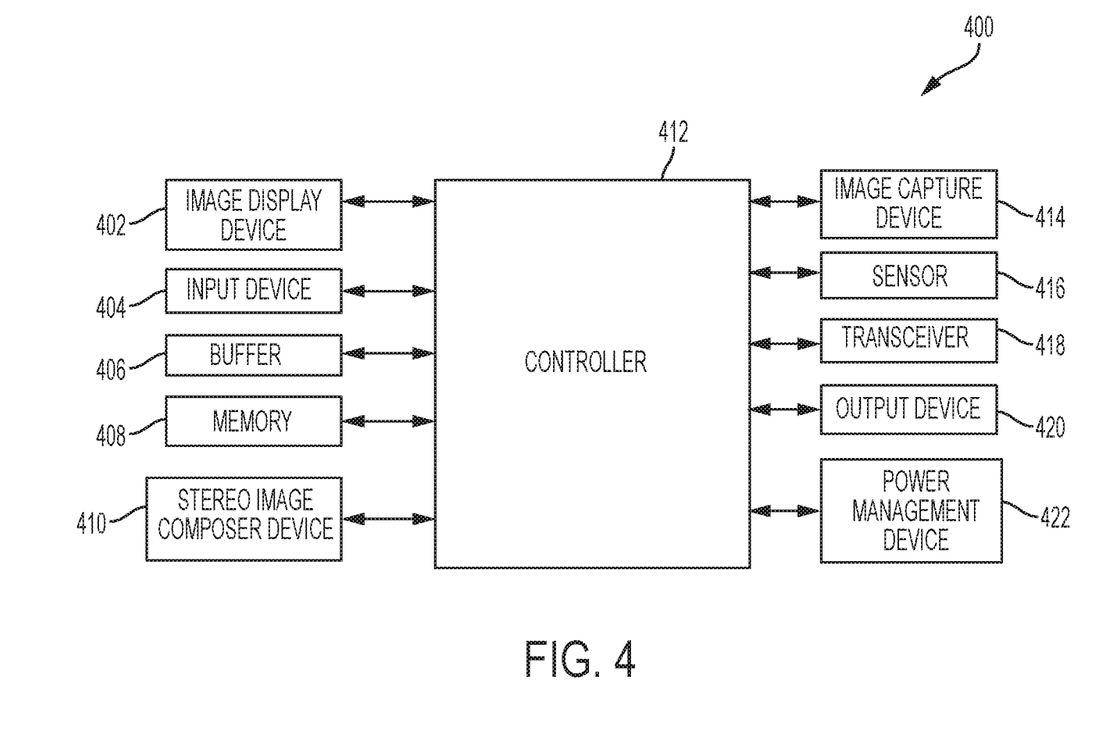
FIG. 4 is a block diagram illustrating a configuration of a portable image device according to various embodiments of the present disclosure.

FIG. 4 is a block diagram illustrating a configuration of a portable image device according to various embodiments of the present disclosure.

Referring to FIG. 4, the portable image device 400 includes an image display device 402, an input device 404, a buffer 406, a memory 408, a stereo image composer device 410, and a controller 412. In an exemplary embodiment, the portable image device 400 may be portable image device 100 and/or portable image device 200.

The image display device 402 is configured to display an image to a user of the portable image device 400. The image display device 402 may be a single display or a plurality of displays configured to display an image to the user. For example, the image display device 402 may be used to display a two-dimensional image and/or a three-dimensional image to the user. For example, the image display device 402 may include at least one of a display panel, a lens, a laser, and a projector to create two-dimensional or three-dimensional images including holograms.

The input device 404 is configured to receive an input. The input device 404 may include one or more different types of input devices. For example, the input device 404 can be a tactile input device such as a button or an audio input device such as a microphone. The input device 404 may include one or more buttons configured to receive an input from the user. In an exemplary embodiment, a user may interact with the input device 404 to turn the portable image device 400 on and off or select and/or search for a menu item or icon. The input device 404 may also be a separate device in communication with the portable image device 400 where the input is received at the input device 404 and then an indication that an input has been detected is communicated to the portable image device 400.

When the input device 404 includes at least one button, the button can include one or more of a power button, a volume button, a menu button, a home button, a back button, navigation buttons (e.g., left button, right button, up button, down button, etc.), or a combination thereof. In an exemplary embodiment, the input device 404 can further include a keypad to receive a key input from the user to control the portable image device 400. The keypad may be a physical keypad coupled with the portable image device 400, a virtual keypad displayed by a projector of the portable image device 400, or a combination thereof.

When the input device 404 includes a microphone, the microphone generates an electrical signal from a sound wave where the electrical signal indicates an input from the user.

The buffer 406 is configured to temporarily store information. For example, buffer 406 may be configured to temporarily store image content information. The buffer 406 may include one or more buffers.

The memory 408 is configured to store information. The memory 408 includes at least one of a non-transitory computer readable storage medium. In an exemplary embodiment, the memory 408 may include at least one of an external memory device functionally connected with the portable image device 400 and a storage device integrally formed with the portable image device 400 such as a hard drive.

The stereo image composer device 410 is configured to generate a stereo image to display on the image display device 402. In an exemplary embodiment, the stereo image composer device 410 can generate a stereo image to display on the image display device 402 from an image object transmitted from the buffer 406 and/or an image from the memory 408.

The controller 412 is configured to control one or more operations of the portable image device 400. In an exemplary embodiment, the controller 412 is configured to receive a first input indicative of an input associated with an application of the portable image device 400. An image object may be generated in the buffer 406 of the portable image device 400 after receiving the first input. A first image may be generated based on the image object generated in the buffer 406. The first image may be stored in memory 408. A stereo image may be generated by the stereo image composer device 410 based on the first image where the stereo image is then displayed on the image display device 402. The stereo image may be an image associated with only the application or the stereo image may be associated with the full view available to the user (e.g., one or more application interfaces, background or desktop-like images, etc.).

In another exemplary embodiment, after the stereo image is displayed on the image display device 402, the controller 412 may determine whether to update the stereo image each frame. When it is determined that the stereo image is to be updated, a second image object may be generated in the buffer 406 reflecting the change or modification of the image, a second image may be generated and/or stored, and a second stereo image may be generated based on the second image. When it is determined that the stereo image does not need to be updated, the stereo image composer device 410 may re-generate the stereo image using the first image stored in the memory 408 or continue to display the stereo image without re-generating or re-rendering the image.

In another exemplary embodiment, the controller 412 is configured to receive an input indicative of executing an application. The stereo image composer device 410 can generate an image based on an image stored in the memory 408 before the application is fully executed.

In another exemplary embodiment, the controller 412 is configured to receive an input indicative of a request to close a currently executed application. An image of the screen of the application may be captured and an image can be generated in the buffer 406 based on the captured image of the screen. The image may be stored in the memory 408 and used by the stereo image composer device 410 when an input to execute the application is received.

While not required, the portable image device 400 may further include an image capture device 414, a sensor 416, a transceiver 418, an output device 420, and a power management device 422.

The image capture device 414 is configured to capture an image. The image capture device 414 may include one or more cameras such as an infrared camera, an RGB camera, a combination thereof, etc. In an exemplary embodiment, the image capture device 414 includes a lens system and an image sensor, and may further include a flash. The image capture device 414 converts an optical signal input (or captured) through the lens systems into an electrical image signal and outputs the electric image signal to the controller 412. The image capture device 414 may capture a moving object or a still object. In addition, the image capture device 414 may be further configured to detect a motion or gesture.

The sensor 416 is configured to detect a state of the portable image device 400 and/or a state of the surrounding environment of the portable image device 400. The sensor 416 may include one or more sensors that detect a state or surrounding environmental condition of the portable image device and transmit a signal indicative of the detection to the controller 412.

The sensor 416 may include at least one of a proximity sensor for detecting the proximity of an object to the portable image device 400, a motion/orientation sensor for detecting a motion or orientation (e.g., rotation, acceleration, deceleration, and vibration) of the portable image device 400, an illumination sensor for detecting ambient illumination in the surrounding environment of the portable image device 400, or a combination thereof. The motion/orientation sensor may include at least one of an acceleration sensor, a gravity sensor, a geomagnetic sensor, a gyro sensor, a shock sensor, a global positioning system (GPS) sensor, and a compass sensor.

The transceiver 418 is configured to transmit and/or receive signals. In an exemplary embodiment, the transceiver 418 is used to establish communication with one or more devices such as an electronic device or a peripheral/auxiliary device. The transceiver 418 may include one or more devices configured to transmit and/or receive short-range and/or long-range communications. For example, short range communications may include at least one of BLUETOOTH, Infrared Data Association (IrDA), Wi-Fi, Near Field Communication (NFC), etc.

The output device 420 is configured to provide information to the user. For example, the output device 420 may be a speaker configured to output sound to the user or to another party different from the user.

The power management device 422 is configured to manage the power of the portable image device. For example, the power management device 422 may include a power management integrated circuit (PMIC), a charger IC, a battery, and/or a battery gauge. The battery may store or produce electricity to supply power to the portable image device. The battery gauge measures various attributes of the battery. For example, the battery gauge may be configured to measure the remaining capacity, the voltage, the current, and/or the temperature of the battery. In an exemplary embodiment, an indicator associated with the battery status may be displayed on the image display device 402 of the portable image device 400.

FIGS. 5-8 are flow charts illustrating a method of displaying an image on a display of a portable image device according to various embodiments of the present disclosure.

Referring to FIGS. 5-8, the methods will be discussed with reference to exemplary portable image device 400 illustrated in FIG. 4. However, the methods can be implemented with any suitable portable image device including portable image device 100 and portable image device 200. In addition, although FIGS. 5-8 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Figure 5:
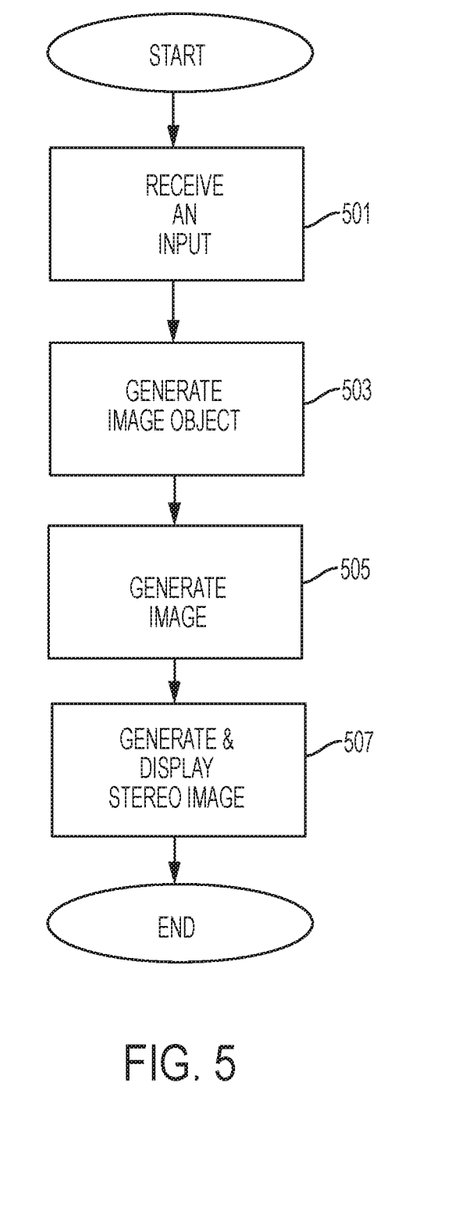
FIG. 5 is a flow chart illustrating a method of generating an image according to various embodiments of the present disclosure.

Referring to FIG. 5, at operation 501, an input is received at the portable image device 400. For example, an input or selection may be provided via the input device 412. The input may be associated with an application. In an exemplary embodiment, after an application is executed or launched, an input event such as a selection or alphanumeric input may be detected. For instance, when the application is a calendar or scheduling application, an initial image such as a month view image may be displayed. An input associated with a selection of a day of the month (e.g., the 15$^{th}$) or an input associated with the input of an event to be scheduled may be detected.

At operation 503, a first image object may be generated. For example, the first image object may be generated at buffer 407 after the input is detected. The first image object may correspond to image content where one bit represents one pixel or multiple bits represent one pixel. In an exemplary embodiment, the first image object may have a first image format such as an uncompressed bitmap format.

In an exemplary embodiment, the first image object may be generated by defining an image context parameter (e.g., size, opaqueness, and scale), providing image content to the buffer based on the image context parameter, and generating the image object from the image content and the image context parameter.

At operation 505, a first image is generated. For example, the first image may be compressed and/or scaled to create a first image where the first image has a different format from the first image object. In an exemplary embodiment, the first image format may include a JPEG, a MPEG, or a PGN format.

In an exemplary embodiment, the first image may be generated using background processing. A layered and/or progressive format may be used to improve processing time and reduce perceived delays. The first image may be a snapped or captured image or have a static texture format. In addition, the first image may be compressed or have a progressive format coding.

In another exemplary embodiment, additional processing and or additional information may be added to the first image object information when the first image is generated. For example, the first image object may correspond to snapshots or screen captures of the application. Various management and organizational techniques may be performed including productivity and/or enterprise related work and additional imaging or computer vision tasks. In addition, customized scaling and resizing such as seam carving may also be performed. Moreover, additional information may be added to the first image object such as embedding copyright and/or privacy information, pre-defined (e.g., customized) or live (e.g., dynamic) annotations, icons, time stamps, etc. may also be added.

At operation 507, a first stereo image is generated and displayed. For example, the first stereo image is generated by the stereo image composer device 410 based on the first image. The stereo image composer device 410 can generate a left image and a right image to represent the first image. After the first stereo image is generated by the stereo image composer device 410, the first stereo image is displayed on the image display device 404.

In an exemplary embodiment, the first image may also be stored in the memory 408. In addition, the stereo image composer device 410 may generate the stereo image by retrieving the first image from the memory 408 or the first image may also be sent from the buffer 406 to the stereo image composer device 410 to be used to generate the stereo image in order to reduce call and/or processing time.

Figure 6:
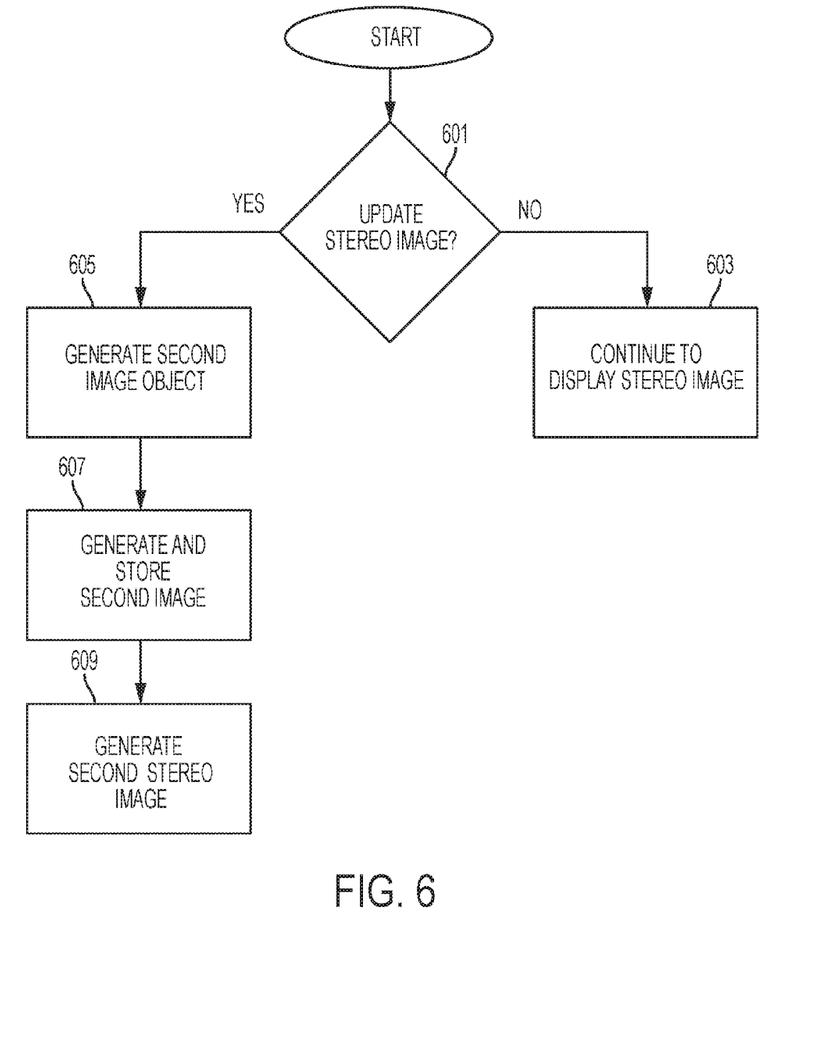
FIG. 6 is a flow chart illustrating another method of generating an image according to various embodiments of the present disclosure.

Referring to FIG. 6, at operation 601, a determination whether to update the stereo image is made. For example, for each frame, the controller may determine whether to update the stereo image. The determination may be made based on various events. For example, the various events may include a user event (e.g., an input) being detected, a time event defined by the application having elapsed, creating a flicker of a cursor displayed on the screen, etc.

At operation 603, when it is determined that the stereo image does not need to be updated, the stereo image is continuously displayed. For example, the stereo image composer device 410 may re-generate the stereo image using the first image stored in the memory 408 or continue to display the stereo image without re-generating or re-rendering the image.

At operation 605, when it is determined that the stereo image is to be updated, a second image object may be generated in the buffer 406 reflecting the change or the modification of the image.

At operation 607, a second image may be generated and/or stored at the memory 408 and, at operation 609, a second stereo image may be generated based on the second image similar to the process described above.

In an exemplary embodiment, the second image may represent an entire image associated with the application. Alternatively, the second image object may be updated such that only a portion of the image content data is modified where the portion of the image content data is modified based on the event.

Figure 7:
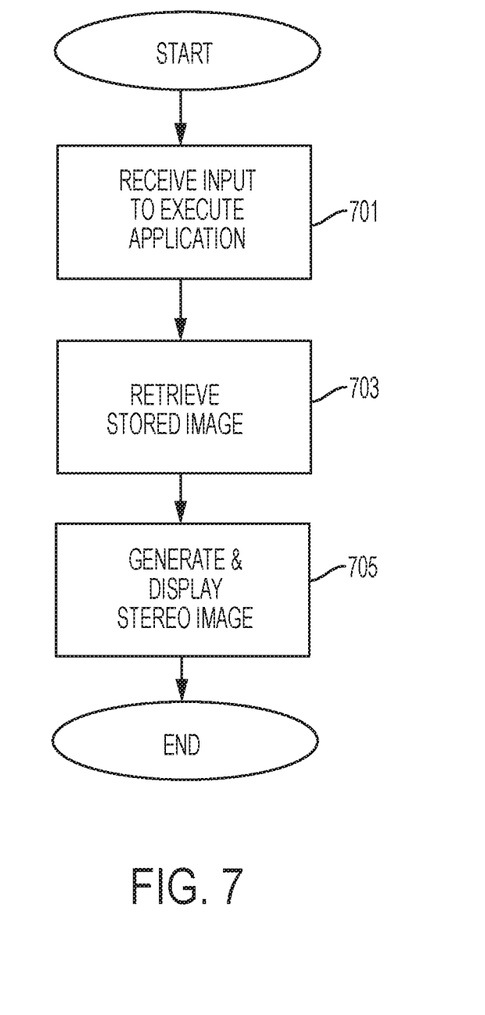
FIG. 7 is a flow chart illustrating another method of generating an image according to various embodiments of the present disclosure.

Referring to FIG. 7, at operation 701, an input indicative of executing an application is received. For example, an input indicator is provided by input device 404 to the controller 412 where the controller 412 determines that the input is associated with initiating execution or launching of the application.

At operation 703, a stored image is retrieved. For example, the controller 412 may retrieve a stored image from the memory 408. The stored image may represent an initialization screen of the application.

At operation 705, a stereo image is generated and displayed. For example, the stereo image composer device 410 can generate a stereo image based on the stored image where the stereo image that is generated is displayed on the image display device 402. The stereo image may be generated and/or displayed before or after the execution of the application is completed. For example, if the stereo image is displayed before the execution of the application is completed, a user may not perceive any delay in the execution and/or processing time associated with the execution of the application.

Figure 8:
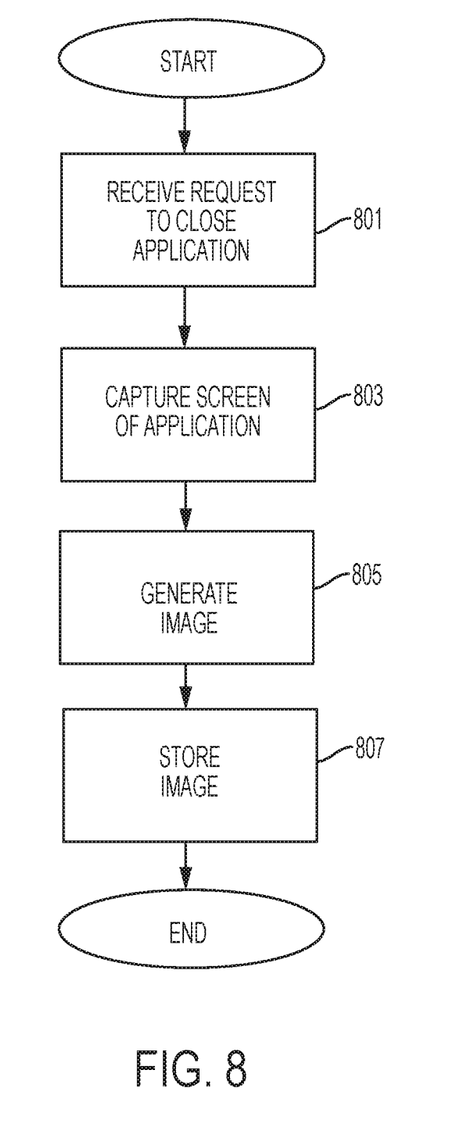
FIG. 8 is a flow chart illustrating another method of generating an image according to various embodiments of the present disclosure.

Referring to FIG. 8, at operation 801, a request to close an application is received. For example, the controller 412 may receive an input indicating that a request to close an application has been received.

At operation 803, a screen of the application is captured. For example, a snapshot or screen capture may be performed on the screen currently displayed when the request to close the application is received.

At operation 805, an image is generated. For example, the information associated with the snapshot or the screen capture may be transferred to the buffer 406. The image information associated with the snapshot or screen capture may be compressed or processed to generate an image.

At operation 807, the image is stored. For example, after the image is generated in the buffer 406, the image may be transferred to the memory 408 to be stored.

While the above method is described with respect to receiving an indication to close an application, the process may be performed any time in which an input indicative of storing an image used to generate a stereo image is received. In addition, a plurality of images may be stored in the memory 408 where the stereo image composer device 410 may generate a stereo image using the plurality of images at different times during execution of the application.

In an exemplary embodiment, a snapshot of an application may be captured into a screenshot bitmap texture. Background processing may be performed on the bitmap texture to allow the texture to be rendered as a stereo image. The image may be rendered for background or unfocused applications in different depths. In addition, for background applications, the image may be rendered in a hybrid way where images associated with some background applications are rendered as static textures while images associated with other background applications are rendered as live apps (e.g., each frame is generated from image objects provided by a buffer where the image objects are not pre-processed or pre-scaled). In addition, images associated with background applications may be rendered in different depths using different resolution textures in order to optimize a three-dimensional virtual reality viewing experience.

Also, each image associated with an application may be rendered to have a different size and or different levels of detail based on the type of application scenario such as productivity, enterprise, education, social network, etc. For example, in gaming virtual reality applications, a left and/or a right screen may be captured and a title may be added to the left and/or right screens in a scaled-down snapshot or a texture/snapshot array for animation where the texture is displayed in the background. In entertainment/media virtual reality applications, a left and/or a right screen may be captured and the screenshot of the application is saved and stored in the memory 408. In medical virtual reality applications, a left and/or right screen may be captured and a texture or snapshot array for animation may be saved and/or privacy information may be added. In education virtual reality applications, a left and/or right screen may be captured and the screenshot of the application may be saved and/or an animated logo or texture array, etc. may be added. In static non-virtual reality applications that are dominated by images or textures, the whole screen may be captured and seam carving, etc. may be performed for better content-aware resizing, etc. In static non-virtual reality application that are dominated by letters and numbers, the whole screen may be captured and the screen shot of the application may be captured to preserve textures or letters without much processing. In interactive/connected non-virtual reality applications dominated by images and textures, the whole screen may be captured and seam carving may be performed to resize or capture an array of textures/snaps for animation. In interactive/connected non-virtual reality applications dominated by letters and numbers, the whole screen may be captured where the screen shot may be captured without much processing and capture an array of textures for animation. In system screens, virtual keyboards, notifications, etc. applications, the whole screen may be captured or the window associated with the application where the screen may be captured and annotations, etc. may be added.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method of displaying an image on a portable image device, the method comprising:
    receiving a first input indicative of an input associated with an application;
    generating a first image object in a buffer of the portable image device in response to the first input, the first image object corresponding to a screen capture of an execution screen of the application and being of a first image format;
    storing the first image object in a memory of the portable image device;
    generating a first image using the first image object stored in the memory of the portable image device, the first image being of a second image format different from the first image format; and
    displaying the first image on an image display device of the portable image device.

2. The method of claim 1, wherein the generating of the image object comprises:
    defining an image context parameter in the buffer of the portable image device;
    providing image content to the buffer of the portable image device based on the image context parameter; and
    generating the image object from the image content and the image context parameter.

3. The method of claim 2, wherein the image context parameter includes at least one of size, opaqueness, or scale.

4. The method of claim 2, wherein the first image format is a bitmap image file format.

5. The method of claim 1, wherein the first image is a stereo image.

6. The method of claim 1, wherein the generating of the first image using the first image object stored in the memory of the portable image device is performed for each frame in which the first image is displayed on the image display device of the portable image device.

7. The method of claim 1, wherein the first input is received after the application is executed at the portable image device.

8. The method of claim 7, further comprising:
receiving a second input indicative of a request to execute the application, the second input being received before the first input; and
displaying a second image on the image display device of the portable image device based on the second input, wherein the second image corresponds to an initial screen of the application.

9. The method of claim 8, wherein the second image is loaded from the memory of the portable image device.

10. The method of claim 9, wherein the second image is generated using a second image object corresponding to an execution screen of the application captured during a previous execution of the application.

11. The method of claim 1, further comprising:
receiving a third input indicative of a request to close the application, the third input being received after the first input;
capturing an image of the screen of the application after receiving the third input;
generating a third image object based on the captured image of the screen of the application;
generating a third image using the third image object; and
storing the third image in the memory of the portable image device.

12. The method of claim 11, wherein the generating of the third image object comprises:
defining another image context parameter in the buffer of the portable image device;
providing image content corresponding to the captured image of the screen of the application to the buffer of the portable image device based on the other image context parameter; and
generating the third image from the image content corresponding to the captured image of the screen of the application and the other image context parameter.

13. A portable image device comprising:
an image display device configured to display an image;
an input device configured to receive an input;
a buffer; and
at least one processor configured to:
receive a first input from the input device, the first input being indicative of an input associated with an application,
control the buffer to generate a first image object in response to the first input, the first image object corresponding to a screen capture of an execution screen of the application and being of a first image format,
store the first image object in the memory,
control a stereo image composer device to generate a first image using the first image object stored in the memory, the first image being of a second image format different from the first image format, and
control the image display device to display the first image.

14. The portable image device of claim 13, wherein the at least one processor is further configured to:
define an image context parameter in the buffer;
provide image content to the buffer based on the image context parameter; and
control the buffer to generate the image object from the image content and the image context parameter.

15. The portable image device of claim 14, wherein the image context parameter includes at least one of size, opaqueness, or scale.

16. The portable image device of claim 13, wherein the first image format is a bitmap image file format.

17. The portable image device of claim 13, wherein the first image is a stereo image.

18. The portable image device of claim 13, wherein the first image is generated for each frame in which the first image is displayed on the image display device.

19. The portable image device of claim 13, wherein the first input is received after the application is executed at the portable image device.

20. The portable image device of claim 19, wherein the at least one processor is further configured to:
receive a second input indicative of a request to execute the application, the second input being received before the first input; and
control the image display device to display a second image based on the second input,
wherein the second image corresponds to an initial screen of the application.

21. The portable image device of claim 20, wherein the second image is loaded from the memory of the portable image device.

22. The portable image device of claim 21, wherein the second image is generated using a second image object corresponding to an execution screen of the application captured during a previous execution of the application.

23. The portable image device of claim 13, wherein the at least one processor is further configured to:
receive a third input indicative of a request to close the application, the third input being received after the first input;
capture an image of the screen of the application after receiving the third input;
control the buffer to generate a third image object based on the captured image of the screen of the application;
generate a third image using the third image object; and
store the third image in the memory of the portable image device.

* * * * *